(12) United States Patent
Murase et al.

(10) Patent No.: US 8,653,404 B2
(45) Date of Patent: Feb. 18, 2014

(54) IN-LIQUID PLASMA ELECTRODE, IN-LIQUID PLASMA GENERATING APPARATUS AND IN-LIQUID PLASMA GENERATING METHOD

(75) Inventors: Hitotoshi Murase, Kariya (JP); Toshihisa Shimo, Kariya (JP); Hiroaki Takashima, Kariya (JP); Hiromichi Toyota, Matsuyama (JP); Shinfuku Nomura, Matsuyama (JP); Tsunehiro Maehara, Matsuyama (JP)

(73) Assignees: Kabushiki Kaisha Toyota Jidoshokki, Aichi-Ken (JP); Ehime University, Ehime-Ken (JP)

( * ) Notice: Subject to any disclaimer, the term of this patent is extended or adjusted under 35 U.S.C. 154(b) by 1468 days.

(21) Appl. No.: 11/792,174

(22) PCT Filed: Dec. 2, 2005

(86) PCT No.: PCT/JP2005/022611
§ 371 (c)(1),
(2), (4) Date: May 15, 2008

(87) PCT Pub. No.: WO2006/059808
PCT Pub. Date: Jun. 8, 2006

(65) Prior Publication Data
US 2009/0109141 A1    Apr. 30, 2009

(30) Foreign Application Priority Data
Dec. 3, 2004 (JP) .................. 2004-350516

(51) Int. Cl.
*B23K 10/00* (2006.01)
(52) U.S. Cl.
USPC .............. 219/121.52; 219/119; 219/73.1; 219/121.36; 219/75; 373/18; 373/54; 315/111.21

(58) Field of Classification Search
CPC ............ B23K 10/00; B23K 9/24; H05H 1/34
USPC .......... 219/121.36, 121.52, 75, 73, 73.1, 119; 427/577, 569; 373/18, 19; 315/111.21
See application file for complete search history.

(56) References Cited

U.S. PATENT DOCUMENTS

| | | | |
|---|---|---|---|
| 2,263,443 A | 11/1941 | Matheson et al. | |
| 3,714,390 A | 1/1973 | Foex et al. | |
| 4,521,890 A * | 6/1985 | Burnham et al. | 373/22 |
| 4,642,440 A | 2/1987 | Schnackel et al. | |
| 4,801,435 A * | 1/1989 | Tylko | 422/186.04 |
| 5,726,414 A * | 3/1998 | Kitahashi et al. | 219/121.48 |
| 7,005,599 B2 * | 2/2006 | Faslivi et al. | 219/121.49 |
| 7,075,031 B2 * | 7/2006 | Strang et al. | 219/121.52 |
| 7,538,294 B2 * | 5/2009 | Scotchmer | 219/119 |
| 2003/0138573 A1 | 7/2003 | Mikhael et al. | |
| 2003/0146310 A1 | 8/2003 | Jackson | |

FOREIGN PATENT DOCUMENTS

| | | |
|---|---|---|
| JP | 61-133159 | 6/1986 |
| JP | 08-024562 | 1/1996 |
| JP | 2002-301136 | 10/2002 |
| JP | 2002-373888 | 12/2002 |
| JP | 2003-071272 | 3/2003 |
| JP | 2003-218035 A | 7/2003 |
| JP | 2003-243373 | 8/2003 |
| JP | 2003-297598 | 10/2003 |
| JP | 2004-512430 | 4/2004 |
| JP | 2004-152523 | 5/2004 |
| JP | 2004-202454 A | 7/2004 |
| KR | 1987-0005560 | 6/1987 |
| KR | 2002-0083564 | 11/2002 |
| WO | WO 02/38827 | 5/2002 |
| WO | WO 03/032932 | 4/2003 |
| WO | WO 03/096767 | 11/2003 |

OTHER PUBLICATIONS

Korean Office Action dated Dec. 10, 2008 corresponding to the application No. 10-2007-7012623 without English translation.
International Search Report of PCT/JP2005/022611, dated Apr. 4, 2006.
Korean Office Action dated Apr. 28, 2008, received in corresponding Korean Patent Application No. 2007-7012623 without English translation.
English translation of the International Preliminary Report on Patentability dated Jun. 14, 2007, Application No. PCT/JP2005/022611.

Second Office Action issued in corresponding Chinese patent application No. 200580047253.3, issued Jun. 30, 2011.
The Official Communication for German Patent Application No. 11 2005 003 029.6-54, dated Jul. 27, 2010 (including translation of the Official Letter received Aug. 20, 2010).

* cited by examiner

*Primary Examiner* — Mark Paschall
(74) *Attorney, Agent, or Firm* — Locke Lord LLP (57) ABSTRACT

An in-liquid plasma electrode according to the present invention is an in-liquid plasma electrode for generating plasma in a liquid and has an electrically conductive member having an electric discharge end surface in contact with the liquid, and an electrically insulating member covering an outer periphery of the conductive member at least except the electric discharge end surface. Preferably, d and x satisfy $-2d \leq x \leq 2d$, where d is a length of a minor axis of the cross section when a conductive end portion of the electrically conductive member having the electric discharge end surface has an approximately circular cross section, or d is a length of a short side of the cross section when the conductive end portion has an approximately rectangular cross section, and x is a distance from a reference plane to a plane containing the electric discharge end surface when the reference plane is an end surface of the electrically insulating member that is approximately parallel with the electric discharge end surface. Owing to this construction, it is possible to provide an in-liquid plasma electrode which can simply generate plasma in a wide variety of liquids including a conductive liquid such as water and alcohol, and furthermore an in-liquid plasma generating apparatus having this electrode, and an in-liquid plasma generating method using this electrode.

11 Claims, 4 Drawing Sheets

IN-LIQUID PLASMA ELECTRODE, IN-LIQUID PLASMA GENERATING APPARATUS AND IN-LIQUID PLASMA GENERATING METHOD

FIELD OF THE INVENTION

This invention relates to plasma technology for generating plasma in a liquid and more particularly to a method and an apparatus for generating high energy plasma in a liquid and an electrode used therein.

BACKGROUND OF THE INVENTION

As vapor deposition technique using plasma, vapor deposition technique using vapor phase plasma has conventionally been used widely. However, in vapor phase plasma, which has a low material density, the reaction rate is low. Therefore, there is a need for technology for generating plasma in a liquid, which has a high material density.

For example, the pamphlet of International Publication No. 02/038827 (Document 1) describes an invention of producing a stream of bubbles containing a source of a material to be deposited in an electrolyte in which a pair of spaced electrodes are disposed and generating plasma glow discharge in the bubble region, thereby depositing the material on one of the electrodes.

However, the invention recited in Document 1 makes use of direct current glow discharge. Document 1 partially mentions assisting glow discharge generation by microwave or electromagnetic wave radiation, but gives no specific description about it. There are many unclear points from a technical viewpoint and the technique recited in Document 1 is considered to be nothing but direct current glow discharge. Therefore, the reaction rate is assumed to be at the same level as vapor phase plasma.

Moreover, the bulletin of Japanese Unexamined Patent Publication No. 2002-301136 (Document 2) also describes irradiating a liquid with microwaves from outside a vessel and thereby decomposing hazardous substances in the liquid. Document 2 is to radiate microwaves from outside a vessel and thereby decompose hazardous substances contained in a liquid in the vessel, but does not explain by what mechanism the hazardous substances are decomposed. Therefore, it is unlikely that this manner of microwave radiation generates plasma in the liquid, and Document 2 does not describe that plasma was generated in the liquid. Even if plasma generation in the liquid is not impossible, there will be a need to supply extremely large electric power and it is of little practical use.

In addition, in the bulletin of Japanese Unexamined Patent Publication No. 2003-297598 (Document 3) and the bulletin of Japanese Unexamined Patent Publication No. 2004-152523 (Document 4), the inside of a liquid such as dodecane is irradiated with ultrasonic waves by an ultrasonic wave generator, thereby generating bubbles in the liquid, and at the same time the liquid at a position where the bubbles are generated is irradiated with electromagnetic waves by an electromagnetic wave generator, thereby generating high energy plasma in the bubbles.

SUMMARY OF THE INVENTION

The methods of generating in-liquid plasma by irradiating the inside of a liquid with electromagnetic waves as described in the above Documents 3 and 4 are expected to obtain a high reaction rate because molecular density in liquid phase is extremely higher than that of vapor phase. However, in a conductive liquid such as water and alcohol, there is a problem that eddy current is generated in the liquid and dissipates energy of the radiated electromagnetic waves. There is also a problem that the electromagnetic waves attenuate because a hydroxyl group or the like absorbs a certain frequency.

The present invention has been conceived in view of the above problems and it is an object of the present invention to provide an in-liquid plasma electrode, an in-liquid plasma generating apparatus and an in-liquid plasma generating method which can simply generate plasma in a wide variety of liquids including a conductive liquid such as water and alcohol.

In order to solve the above problems, an in-liquid plasma electrode according to the present invention is an in-liquid plasma electrode for generating plasma in a liquid, and is characterized by having a conductive member having an electric discharge end surface in contact with the liquid; and an insulating member covering an outer periphery of the conductive member at least except the electric discharge end surface.

Moreover, preferably a conductive end portion of the conductive member having the electric discharge end surface has a roughly circular or roughly rectangular cross section and d and x satisfy $-2d \leq x \leq 2d$, and more preferably $-d \leq x \leq d$, where d is a length of a minor axis or a short side of the cross section, and x is a distance from a reference plane to a plane containing the electric discharge end surface when the reference plane is an end surface of the insulating member in roughly parallel with the electric discharge end surface.

Here, when $0<x$, the electric discharge end surface outwardly protrudes from the end surface (the reference plane) of the insulating member. When $x=0$, the electric discharge end surface and the reference plane lie in the same plane. When $x<0$, the electric discharge end surface inwardly recedes from the end surface (the reference plane) of the insulating member.

According to the in-liquid plasma electrode of the present invention, since an insulating member is provided at an outer periphery of the conductive member at least except the electric discharge end surface, an advantage of being capable of generating high energy plasma in a wide variety of liquids such as a water-containing liquid is obtained. Moreover, since the relationship between the abovementioned d and the abovementioned x is maintained in an appropriate range, plasma can be generated in a liquid without applying extremely large electric power to the electrode. Therefore, a large electric power source is not necessarily required. Furthermore, the in-liquid plasma electrode has a simple structure and an in-liquid plasma generating apparatus mentioned later can be made simple.

Moreover, an in-liquid plasma generating apparatus according to the present invention is characterized by having:
a vessel for containing a liquid;
an in-liquid plasma electrode having a conductive member having an electric discharge end surface in contact with the liquid, and an insulating member covering an outer periphery of the conductive member at least except the electric discharge end surface, at least an end portion of the in-liquid plasma electrode being placed within the vessel; and
a high frequency power source for supplying electric power to at least the conductive member.

Furthermore, an in-liquid plasma generating method according to the present invention is an in-liquid plasma generating method for generating plasma in a liquid and is characterized by supplying electric power by a high frequency electric source to an in-liquid plasma electrode having a conductive member having an electric discharge end surface in contact with the liquid, and an insulating member covering an outer periphery of the conductive member at least except the electric discharge end surface.

Owing to the abovementioned in-liquid plasma electrode of the present invention, the in-liquid plasma generating apparatus and the in-liquid plasma generating method of the present invention have an advantage of being capable of generating high energy in-liquid plasma in a wide variety of liquids such as a water-containing liquid.

BRIEF DESCRIPTION OF THE DRAWINGS

The present invention can be more deeply understood by referring to the following detailed description and the attached drawings. Hereinafter, brief description of the drawings will be made.

DETAILED DESCRIPTION OF THE PREFERRED EMBODIMENTS

Figure 1:
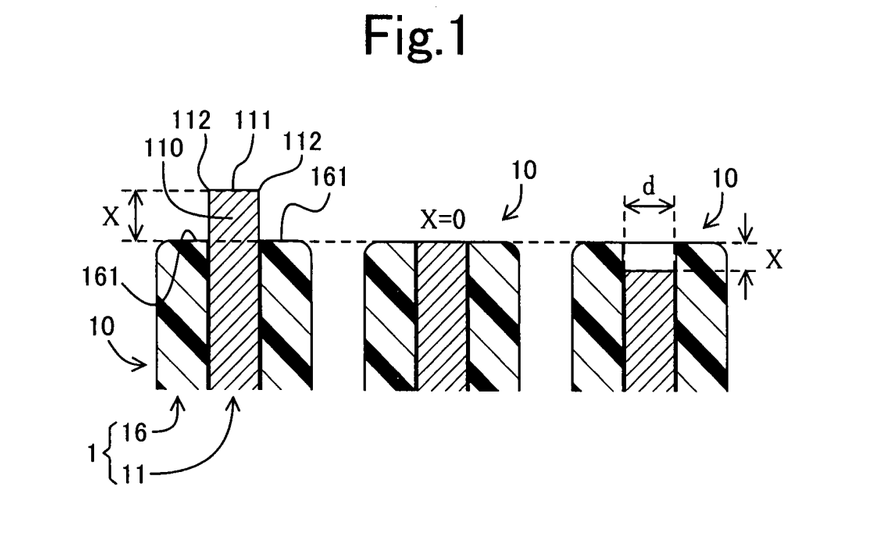
FIG. 1 are longitudinal cross sectional views of end portions of examples of the in-liquid plasma electrode of the present invention.
Figure 2:
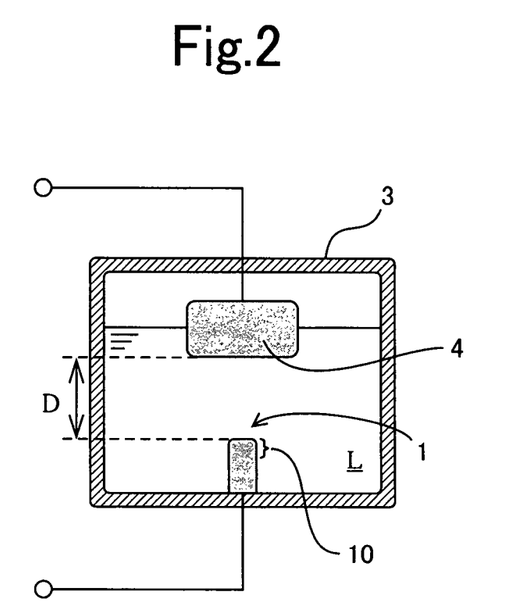
FIG. 2 is an explanatory view illustrating one example of the in-liquid plasma generating apparatus of the present invention.
Figure 3:
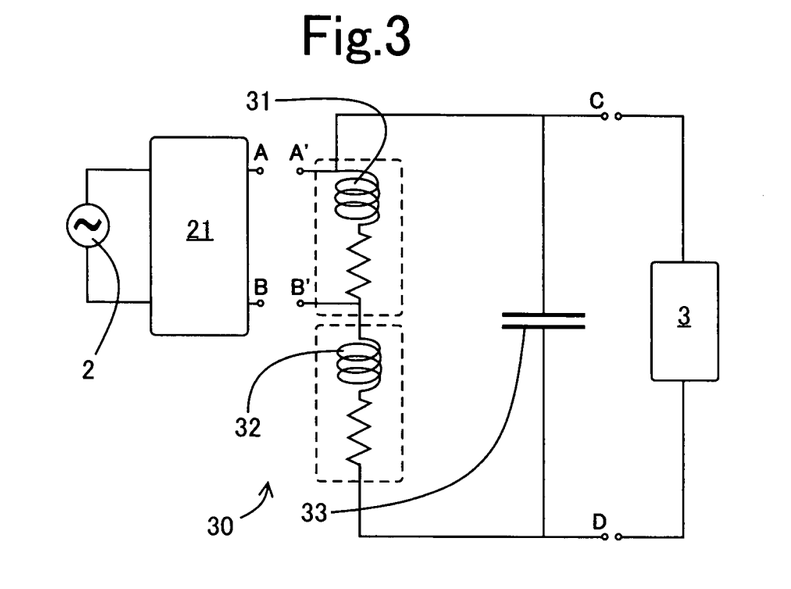
FIG. 3 is a circuit diagram illustrating one example of a high frequency circuit used in the in-liquid plasma generating apparatus of the present invention.

In order to describe the present invention in more detail, best mode for carrying out this invention will be described based on the drawings. The respective figures of FIG. 1 are longitudinal cross sectional views illustrating examples of the in-liquid plasma electrode. FIG. 2 is an explanatory view illustrating one example of the in-liquid plasma generating apparatus. FIG. 3 is a circuit diagram illustrating one example of a high frequency circuit used in the in-liquid plasma generating apparatus.

An in-liquid plasma generating apparatus mainly comprises an in-liquid plasma electrode 1, a high frequency power source 2 and a vessel 3 for containing a liquid L, as one example thereof is illustrated in FIGS. 2 and 3. As its examples are shown in FIG. 1, the in-liquid plasma electrode 1 has a conductive member 11 and an insulating member 16. Note that FIGS. 1 to 3 are views illustrating examples of the in-liquid plasma electrode and the in-liquid plasma generating apparatus of the present invention and that the present invention is not limited to the configurations illustrated in the figures.

The in-liquid plasma electrode of the present invention is an in-liquid plasma electrode for generating plasma in a liquid and has a conductive member and an insulating member provided at its outer periphery. The conductive member has an electric discharge end surface in contact with the liquid, and an outer periphery of the conductive member at least except the electric discharge end surface is covered with the insulating member.

The material of the conductive member is not particularly limited as long as it is formed of a conductive material. In the case of metallic materials, for example, it is possible to employ not only copper (Cu) and Cu-containing copper alloys, aluminum (Al) and Al-containing aluminum alloys, and stainless steels, but also tungsten (W), silver (Ag), molybdenum (Mo), gold (Au), platinum (Pt), and carbon (C) and various metallic materials containing these elements. Moreover, the shape of the conductive member is not particularly limited.

Preferably the insulating member is formed of resin or ceramics. Concrete examples of the resin include epoxy resin, phenol resin, unsaturated polyester resin, urea resin, melamine resin, polyurethane resin, silicone resin, cyanate resin, polyamide resin, polyacetal, polycarbonate, modified polyphenylene ether, thermoplastic polyester resin, polytetrafluoroethylene, fluorocarbon resin, polyphenylene sulfide, polysulfone, amorphous polyarylate, polyetherimide, polyether sulfone, polyether ketone, liquid crystalline polyester, polyamide-imide, polyimide, polyallylether nitrile, polybenzimidazole, and their polymer alloys. Concrete examples of the ceramics include alumina, alumina-silica, zirconia, silicon nitride-alumina (sialon), mica (fluorophlogopite), wollastonite, hexagonal boron nitride, aluminum nitride, cordierite, and petalite. Moreover, the form of the insulating member is not particularly limited as long as it can cover the outer periphery of the conductive member at least except the electric discharge end surface, and can be appropriately selected in accordance with the shape of the conductive end portion. Note that specifically speaking, "covering the outer periphery of the conductive member at least except the electric discharge end surface" includes not only the state of covering the surface of the conductive member 11 except the electric discharge end surface 111 as shown in the center figure and the right figure of FIG. 1 but also the state of covering the surface of the conductive member 11 except the electric discharge end surface 111 and part of side surfaces extending from the electric discharge end surface 111 as shown in the left figure of FIG. 1.

The in-liquid plasma electrode of the present invention can generate plasma in a liquid without applying excessively large electric power to the electrode by having a characteristic configuration in a region including an end portion (a conductive end portion) of the conductive member having the electric discharge end surface. Therefore, of the in-liquid plasma electrode, the electrode end portion having the conductive end portion will be described in detail in the following description. In the in-liquid plasma electrode, the electrode end portion is a part placed mainly in a liquid and the constitution of other parts than the electrode end portion is not particularly limited as long as it does not deviate from the abovementioned mode of carrying out the invention.

The conductive end portion has an electric discharge end surface on which the insulating member is not provided. The electric discharge end surface can be, for example, when the conductive member has a cuboid shape, one end surface lying at both longitudinal ends of the conductive member or the other end surface. Moreover, the electric discharge end surface can be not only a flat plane but also a curved surface or a hemispherical surface. The shape of the conductive end portion is not particularly limited but preferably a bar shape such as a cylindrical column shape and a prism shape, or a plate shape. Namely, preferably the cross sectional shape of the conductive end portion is a roughly circular shape such as a true circle and an ellipse or a roughly rectangular shape such as a square and a rectangle.

Moreover, preferably the conductive end portion has a chamfered portion at an edge (reference numeral 112 in FIG. 1) of the electric discharge end surface. Preferably the chamfered portion has a curved surface, and preferably the radius of curvature R is not less than 0.01 mm and not more than d/2 (d will be defined later). Formation of the chamfered portion suppresses local electric discharge and reduces damage on the in-liquid plasma electrode. Note that the shape of portions of the conductive member other than the conductive end portion is not limited and preferably it is a shape which allows easy installation in the in-liquid plasma generating apparatus mentioned later.

The form of the insulating member located around the electrode end portion is not particularly limited as long as it is located at an outer periphery of the conductive end portion, and can be appropriately selected in accordance with the shape of the conductive end portion. For example, the insulating member can be formed in a thickness of 0.01 mm or more from the surface of the conductive end portion, although depending on the material of the insulating member.

Here, the respective figures of FIG. 1 are cross sectional views illustrating examples of the in-liquid plasma electrode of the present invention, and specifically, enlarged views of the electrode end portions 10. The conductive end portion 110 having the electric discharge end surface 111 can protrude from the insulating member 16, or can be embedded in the insulating member 16 with the electric discharge end surface 111 exposed. Particularly, it is preferable that d and x satisfy $-2d \leq x \leq 2d$, where d is a length of a minor axis of the cross section when the conductive end portion has a roughly circular cross section, or d is a length of a short side of the cross section when the conductive end portion has a roughly rectangular cross section, and x is a distance from a reference plane to a plane containing the electric discharge end surface when the reference plane is an end surface of the insulating member in roughly parallel with the electric discharge end surface. Since d and x satisfy $-2d \leq x \leq 2d$, plasma can be generated in a liquid without applying extremely large electric power to the electrode. Moreover, if $-d \leq x \leq d$, an electric power necessary for plasma generation can be reduced. As mentioned before, in this description, x is a positive value when the electric discharge end surface protrudes from the reference plane and x is a negative value when the electric discharge end surface recedes from the reference plane.

Note that as for the region of "the conductive end portion", a region of the conductive member having a surface in contact with a liquid is defined as a conductive end portion and when $x \leq 0$, an extremely small (thin) portion having the electric discharge end surface can be regarded as a conductive end portion. In this case, d is a length of a minor axis or a short side of the electric discharge end surface and, when $x \leq 0$, the shape of portions covered with the insulating member is not limited.

Moreover, if the value of x is in the range from −1 mm to 1 mm, plasma can be generated well regardless of the shape of the conductive end portion.

Here, when the electric discharge end surface or the end surface (the reference plane) of the insulating member is a curved surface, a surface including the most distant top face or point from a center portion of the conductive member, or the most distant top face or point from a center portion of the insulating member can be defined as an electric discharge end surface or a reference plane.

Note that, in the conductive end portion, when the shape of the cross section of the conductive end portion is a perfect circle, "d" is equal to the diameter. Moreover, when the shape of the cross section of the conductive end portion is a square, "d" is equal to the length of a side. On the other hand, when the shape of the cross section of the conductive end portion is not a true circle or a square, the length of a minor axis (when the cross section is an ellipse) or the length of a short side (when the cross section is a rectangle) corresponds to "d", but the length of a major axis or a long side is not particularly limited.

An in-liquid plasma generating apparatus can be constituted by using the in-liquid plasma electrode of the present invention mentioned above in detail. The in-liquid plasma generating apparatus mainly has an in-liquid plasma electrode, a high frequency power source for supplying electric power to the electrode, and a vessel for containing a liquid.

The shape and material of the vessel for containing a liquid are not particularly limited as long as it is a vessel which can hold a liquid well throughout plasma generation. Within the vessel, at least an electrode end portion of the in-liquid plasma electrode is provided, and when a liquid is introduced into the vessel, the electrode end portion is located in the liquid. Note that, as shown in FIG. 2, preferably a second electrode 4 is provided within the vessel 3 so as to face the electrode end portion 10 of the in-liquid plasma electrode 1. Although it is only necessary that the in-liquid plasma electrode 1 and the second electrode 4 face each other, desirably the interelectrode distance is from 0.5 to 50 mm. In this description, "the interelectrode distance" is defined as the distance from the abovementioned reference plane to an opposing surface of the second electrode (denoted by reference sign D in FIG. 2). Moreover, the electrode 1 does not have to be located with the electrode end portion 10 facing upward in the bottom of the vessel 3 as shown in FIG. 2, and can be located with the electrode end portion 10 facing downward or in horizontal directions as long as the electrode end portion 10 is contacted with the liquid L. Moreover, although one in-liquid plasma electrode 1 is provided in FIG. 2, a plurality of in-liquid plasma electrodes can be provided.

Furthermore, the pressure of a space including the reaction vessel can be reduced by using a gas discharge means. Owing to the pressure reduction, plasma generation can be easily carried out. Desirably the pressure at this time is from 1 to 600 hPa. Note that since pressure reduction is particularly effective at the start of bubble and plasma generation, the pressure can be returned to normal once bubble and plasma generation becomes stable.

The high frequency power source supplies electric power to the in-liquid plasma electrode, that is, the conductive member. Preferably the high frequency power source is controlled, for example, by a high frequency circuit shown in FIG. 3. As shown in FIG. 3, electric power is supplied from the high frequency power source 2 to a resonance circuit 30 though a matching box 21. The resonance circuit 30 comprises coils 31, 32 and a capacitor 33, and each of a contact C and a contact D of the resonance circuit 30 is connected to each of the second electrode 4 and the in-liquid plasma electrode 1. The resonance circuit 30 is designed to resonate at the frequency of input high frequency waves. Note that, in FIG. 3, the side of the contact C is earthed and connected to the second electrode 4, while the contact D is connected to the in-liquid plasma electrode 1. The frequency used can be appropriately selected in accordance with the kind of liquids and the applications of plasma, and preferably the frequency used is in the range from 3 MHz to 3 GHz. In using a liquid containing much water, if, for example, 13.56 MHz or 27.12 MHz, which are permitted for industrial purposes, is used, the frequency is less susceptible to adsorption by water molecules.

The resonance circuit does not have to be of this type. It can be of series resonance and, when the frequency is high, a line resonator or a cavity resonator can also be used.

When a liquid is introduced into the vessel and the high frequency electric power source is actuated to supply electric power to the in-liquid plasma electrodes owing to heat generation of the in-liquid plasma electrode, the liquid boils and bubbles are generated within the liquid. At the same time, by radiating high frequency waves at a position where bubbles are generated, plasma is generated inside the bubbles. The inside of the bubbles, where the liquid exists in the gaseous state at high temperatures and high pressures, is in a condition that it is easy to generate plasma. Therefore, by radiating electromagnetic waves or the like, plasma can be easily generated inside the bubbles.

Examples of the means for generating bubbles in the liquid include not only the abovementioned method of heating the liquid to boiling by heat generation of the in-liquid plasma electrode but also a method of boiling the liquid by a heating element, a method of radiating ultrasonic waves to the liquid and the like. Therefore, as the means for generating bubbles, for example, a heating element or an ultrasonic generator can be provided in the vessel for holding the liquid. In addition, the in-liquid plasma generating apparatus can be provided with a function of generating bubbles, thereby generating bubbles such as microbubbles and nanobubbles between the electrode and a substrate and making a flow of bubbles which are activated by in-liquid plasma. Or, the in-liquid plasma generating apparatus can be provided with a function of circulating the liquid, thereby circulating the liquid between the electrode and the substrate while generating bubbles.

Moreover, a gas can be supplied between the electrode and the substrate as an assist gas for generating bubbles. When the liquid is alcohol, preferably the gas to be supplied is a hydrocarbon gas such as methane and acethylene, inert gas such as helium and argon, or a reducing gas such as hydrogen.

Plasma to be generated has a high temperature and high energy and is effective for decomposition or synthesis of materials. However, since the plasma exists in the liquid, macroscopically the plasma has a low temperature and is safe and easy to handle. Since the plasma exists in the liquid, which has a high material density, the reaction rate is extremely high.

The in-liquid plasma electrode, the in-liquid plasma generating apparatus and the in-liquid plasma generating method of the present invention are not limited to the abovementioned modes for carrying out the invention. Namely, the present invention can be carried out in a variety of forms modified and improved by those skilled in the art without departing the gist of the invention.

An in-liquid plasma generating apparatus was produced according to the above modes for carrying out the invention. Hereinafter, embodiments of the in-liquid plasma electrode, the in-liquid plasma generating apparatus and the in-liquid plasma generating method will be described together with comparative examples by using FIGS. 3 to 8.

Note that in the following embodiments an apparatus shown in FIG. 3 and FIG. 4 was used as the in-liquid plasma generating apparatus. Hereinafter, the in-liquid plasma generating apparatus used in the following embodiments will be specifically described. Moreover, an example of in-liquid plasma electrodes 1' used in embodiments 1 to 5, 15 to 17 and an example of in-liquid plasma electrodes 1" used in embodiments 6 to 14 are respectively shown in FIG. 5 and FIG. 6.

[Liquid Plasma Generating Apparatus]

A vessel 3 comprises a vessel body formed of quarts glass and having a hollow cylindrical shape, closing members for closing a lower open end and an upper open end of the vessel body each formed of stainless steel and having a roughly circular disk shape. To a center portion of the closing member for closing the lower open end, an in-liquid plasma electrode 1 is fixed. The in-liquid plasma electrode 1 is placed in such a manner that an electrode end portion 10 protrudes into the inside of the vessel 3.

The inside of the vessel 3 is filled with a liquid L and the electrode end portion 10 is located inside the liquid L. A second electrode 4 is held above the in-liquid plasma electrode 1 so as to face the in-liquid plasma electrode 1 with a predetermined interelectrode distance D. The second electrode 4 is a plate-shaped pure aluminum (A1050 (JIS)) and the whole of the second electrode 4 is immersed in the liquid L.

The in-liquid plasma electrode 1 and the second electrode 4 are connected to coils, a capacitor and the like, thereby incorporated in a resonance circuit 30 (FIG. 3) to which high frequency waves are supplied. The second electrode 4 is held by a conductive retainer fixed through an insulator 33 to the closing member for closing the upper open end of the vessel 3. The second electrode 4 is connected to the resonance circuit 30 by way of this retainer. At this time, in the resonance circuit 30, the capacity of the capacitor 33 was 120 pF, a coil 31 was 0.2 μH, a coil 32 was 0.7 μH, and the sum of resistance of the coil 31 and the coil 32 was 0.5 Ω.

The vessel 3 is placed inside an outer vessel 91 which is slightly larger than the vessel 3. The outer vessel 91 has a similar construction to that of the vessel 3, except for having a vacuum pump 90 connected to the outer vessel 91 by way of an exhaust gas passage 95.

In-Liquid Plasma Electrode

First Embodiment

Figure 5:
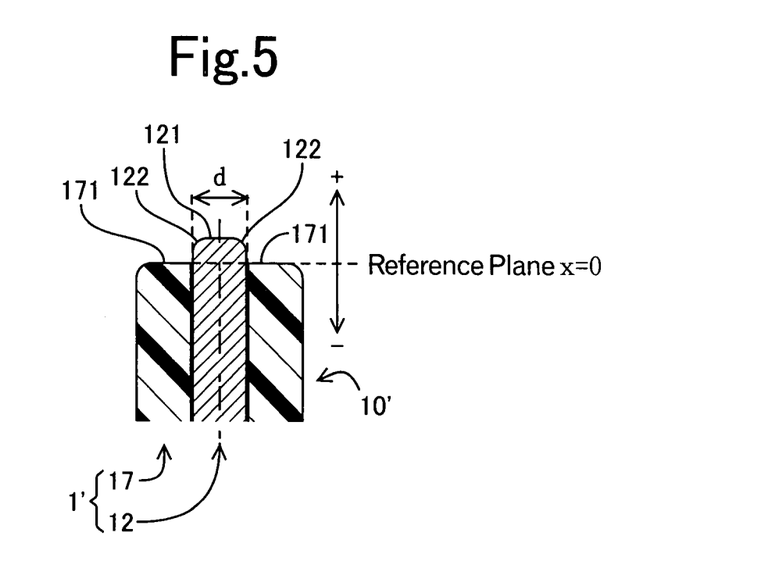
FIG. 5 is a partially enlarged view illustrating one example of an in-liquid plasma electrode of an embodiment and specifically an axially cross sectional view of an end portion of the electrode.

An in-liquid plasma electrode 1' comprises a conductive member 12 formed of metal and an insulating member 17. FIG. 5 is an axially cross sectional view of an electrode end portion 10' of one example of in-liquid plasma electrodes 1' of a first to fifth embodiments. Employed as the conductive member 12 was a cylindrical column (diameter: 3 mm (d=3)) formed of pure aluminum (A1050 (JIS)) and having a flat end surface 121 on one end. In this embodiment, this end surface 121 was used as the electric discharge end surface. At an edge of the end surface 121, a chamfered portion 122 of R=0.2 mm was formed. In addition, employed as the insulating member 17 was a cylindrical ceramic insulating tube (inner diameter: 3 mm, outer diameter: 5 mm, length: 25 mm). The conductive member 12 was inserted into the tubular insulating member 17. At the electrode end portion 10' of the in-liquid plasma electrode 1', the insert position of the conductive member 12 was adjusted to determine a distance x from a reference plane 171 to the end surface 121 (the electric discharge end surface) when the reference plane 171 was an end surface of the insulating member in parallel to the end surface 121. In this embodiment, the in-liquid plasma electrodes 1' were assembled to the abovementioned in-liquid plasma generating apparatus in such a way that the distance from the reference plane 171 to the end surface 121 (the electric discharge end surface) was 5 mm (x=5), 1 mm (x=1), or 0 mm (x=0). Note that in this embodiment, the electrode of x=5 was labeled as #1-1, the electrode of x=1 as #1-2, and the electrode of x=0 as #1-3.

Tap water was prepared as the liquid L and filled into the vessel 3 of the in-liquid plasma generating apparatus. The interelectrode distance D (the distance from the reference plane 171 to the surface of the second electrode 4) was set at 2 mm.

Figure 4:
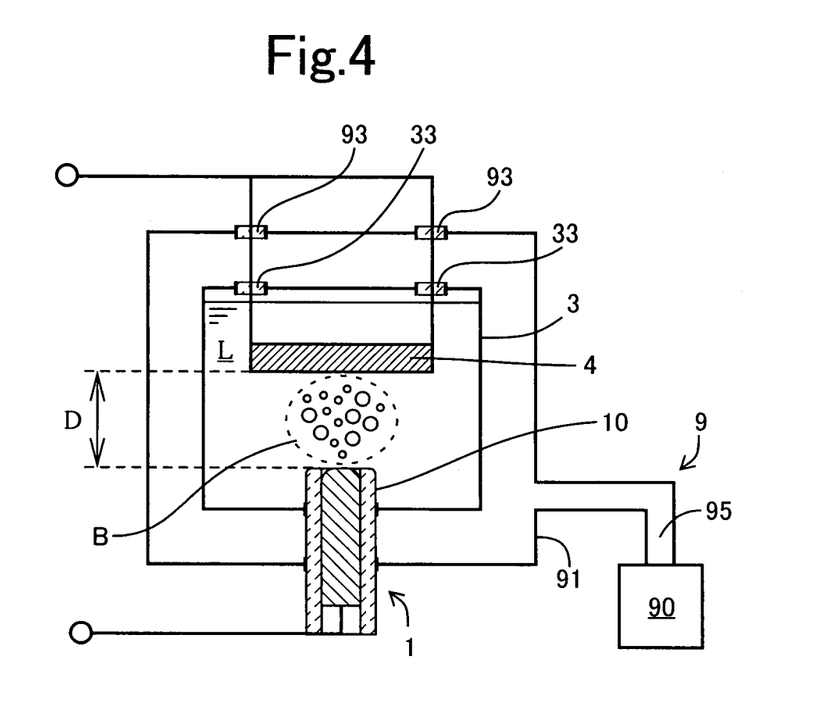
FIG. 4 is an explanatory view illustrating an in-liquid plasma generating apparatus used in embodiments.

First of all, the inside of the outer vessel 91 was depressurized to an in-vessel pressure of 200 hPa. Next, the frequency of output electric power from the high frequency power source 2 was set at 27.12 MHz and electric power supplied to the in-liquid plasma electrodes 1' was controlled from 0 to 600 W, thereby generating, in the liquid L, dense bubbles inside which plasma was generated. The bubbles rose in the liquid L from the electric discharge end surface 121. Regarding the respective electrodes, values of the high frequency electric power when a plasma discharge occurred are shown in Table 1.

the position shown in FIG. 4), an electric discharge was caused by applying an electric power of 200 W.

Second Embodiment

In a second embodiment, as an example of a liquid containing a hydroxyl group, alcohol was used as the liquid L. Namely, plasma was generated by the in-liquid plasma generating apparatus in a similar way to the first embodiment, except that the liquid L was ethanol and the in-vessel pressure was set at 100 hPa. The in-liquid plasma electrodes 1' used at this time were respectively assembled to the vessel 3 in such a manner that x=1, x=0, and x=−1. Regarding the respective electrodes, values of the high frequency electric power when an electric discharge occurred are shown in Table 2.

TABLE 2

| ELECTRODE | CONDUCTIVE MEMBER | | | KIND OF LIQUIDS | INTERELECTRODE DISTANCE D [mm] | IN-VESSEL PRESSURE [hPa] | ELECTRIC POWER AT PLASMA GENERATION [W] |
|---|---|---|---|---|---|---|---|
| | MATERIAL | SIZE d [mm] | DISTANCE x [mm] | | | | |
| #2-1 | Al (A1050) | 3 | +1 | ETHANOL | 2 | 100 | 100 |
| #2-2 | Al (A1050) | 3 | 0 | ETHANOL | 2 | 100 | 100 |
| #2-3 | Al (A1050) | 3 | −1 | ETHANOL | 2 | 100 | 100 |

Even when the liquid L was ethanol, plasma could be generated. In addition, even when the electric discharge end surface 121 protruded from the reference plane 171 (0<x) or receded from the reference plane 171 (x<0), plasma was generated by applying an electric power of 100 W.

The generated plasma moved together with bubbles and came in contact with the surface of the second electrode 4 held in the liquid. When the surface of the second electrode 4 was observed after the electric discharge finished, it was confirmed that carbon activated into a plasma state inside the bubbles was deposited on the surface of the second electrode 4.

TABLE 1

| ELECTRODE | CONDUCTIVE MEMBER | | | KIND OF LIQUIDS | INTERELECTRODE DISTANCE D [mm] | IN-VESSEL PRESSURE [hPa] | ELECTRIC POWER AT PLASMA GENERATION [W] |
|---|---|---|---|---|---|---|---|
| | MATERIAL | SIZE d [mm] | DISTANCE x [mm] | | | | |
| #1-1 | Al (A1050) | 3 | +5 | TAP WATER | 2 | 200 | 500 |
| #1-2 | Al (A1050) | 3 | +1 | TAP WATER | 2 | 200 | 500 |
| #1-3 | Al (A1050) | 3 | 0 | TAP WATER | 2 | 200 | 200 |

When #1-1 to #1-3, in which −2d≤x≤2d, were used, plasma could be generated in water by an electric power of not more than 500 W. Note that when x=0, the size of the plasma was approximately 2.5 mm in width and 2.5 mm in height. Moreover, in the first embodiment, the experiment was carried out with the interelectrode distance D kept constant (2 mm), but even if the distance from the end surface 121 (the electric discharge end surface) to the second electrode 4 was kept constant, the results were essentially the same.

Furthermore, when the electrode (#1-3) of x=0 was horizontally placed in the vessel (in a position turned by 90° from Third Embodiment Plasma was generated by the in-liquid plasma generating apparatus in a similar way to the first embodiment, except that the conductive member 12 had a diameter of 1.5 mm (d=1.5), the liquid L was ethanol, the interelectrode distance D was 3 mm, and the in-vessel pressure was 100 hPa. The inner diameter of the insulating member 17 was also changed to 1.5 mm so as to fit the diameter of the conductive member 12. The in-liquid plasma electrodes 1' used at this time were respectively assembled to the vessel 3 in such a manner that x=±4, ±3, ±1, 0. Regarding the respective electrodes, values of the high frequency electric power when an electric discharge occurred are shown in Table 3.

surface 121 protruded from the reference plane 171 (0<x) or receded from the reference plane 171 (x<0), plasma was generated by applying an electric power of 200 W.

TABLE 3

| ELECTRODE | CONDUCTIVE MEMBER | | DISTANCE x [mm] | KIND OF LIQUIDS | INTERELECTRODE DISTANCE D [mm] | IN-VESSEL PRESSURE [hPa] | ELECTRIC POWER AT PLASMA GENERATION [W] |
| | MATERIAL | SIZE d [mm] | | | | | |
|---|---|---|---|---|---|---|---|
| #3-1 | Al (A1050) | 1.5 | +4 | ETHANOL | 3 | 100 | >600 |
| #3-2 | Al (A1050) | 1.5 | +3 | ETHANOL | 3 | 100 | 480 |
| #3-3 | Al (A1050) | 1.5 | +1 | ETHANOL | 3 | 100 | 200 |
| #3-4 | Al (A1050) | 1.5 | 0 | ETHANOL | 3 | 100 | 200 |
| #3-5 | Al (A1050) | 1.5 | −1 | ETHANOL | 3 | 100 | 200 |
| #3-6 | Al (A1050) | 1.5 | −3 | ETHANOL | 3 | 100 | 500 |
| #3-7 | Al (A1050) | 1.5 | −4 | ETHANOL | 3 | 100 | >600 |

In #3-1 and #3-7, in which x=4, plasma generation was not observed even when the electric power reached 600 W. In #3-2 and #3-6, in which x=3, plasma generation was confirmed at not more than 500 W. In #3-3 to #3-5, in which x=1 or x=0, plasma could be generated in the liquid at 200 W. Namely, since d and x satisfied −2d≤x≤2d, plasma could be generated in the liquid without applying extremely large electric power. Moreover, if −d≤x≤d, an electric power necessary for plasma generation could be reduced.

Fourth Embodiment

Plasma was generated by the in-liquid plasma generating apparatus in a similar way to the first embodiment, except that the conductive member 12 was formed of pure copper (C1011; oxygen free copper (JIS)) and had a diameter of 4 mm (d=4), the liquid L was tetraethoxysilane (TEOS), the interelectrode distance D was 3 mm and the in-vessel pressure was 50 hPa. The inner diameter of the insulating member 17 was also changed so as to fit the diameter of the conductive member 12. The in-liquid plasma electrodes 1' used at this time were assembled in such a way that x=±1, 0. Regarding the respective electrodes, values of the high frequency electric power when an electric discharge occurred are shown in Table 4.

Fifth Embodiment

Plasma was generated by the in-liquid plasma generating apparatus in a similar way to the first embodiment, except that the conductive member 12 was formed of pure copper (C1011) and had a diameter of 0.3 mm (d=0.3), the liquid L was ethanol, the interelectrode distance was 3 mm and the in-vessel pressure was 50 hPa. The inner diameter of the insulating member 17 was also changed so as to fit the diameter of the conductive member 12. The in-liquid plasma electrodes 1' used at this time were assembled in such a way that x=±0.5, 0. Regarding the respective electrodes, values of the high frequency electric power when an electric discharge occurred are shown in Table 5.

TABLE 4

| ELECTRODE | CONDUCTIVE MEMBER | | DISTANCE x [mm] | KIND OF LIQUIDS | INTERELECTRODE DISTANCE D [mm] | IN-VESSEL PRESSURE [hPa] | ELECTRIC POWER AT PLASMA GENERATION [W] |
| | MATERIAL | SIZE d [mm] | | | | | |
|---|---|---|---|---|---|---|---|
| #4-1 | Cu (C1011) | 4 | +1 | TEOS | 3 | 50 | 200 |
| #4-2 | Cu (C1011) | 4 | 0 | TEOS | 3 | 50 | 200 |
| #4-3 | Cu (C1011) | 4 | −1 | TEOS | 3 | 50 | 200 |

Even when TEOS was used as the liquid L, plasma could be generated. In addition, even when the electric discharge end

TABLE 5

| ELECTRODE | CONDUCTIVE MEMBER | | DISTANCE x [mm] | KIND OF LIQUIDS | INTERELECTRODE DISTANCE D [mm] | IN-VESSEL PRESSURE [hPa] | ELECTRIC POWER AT PLASMA GENERATION [W] |
| | MATERIAL | SIZE d [mm] | | | | | |
|---|---|---|---|---|---|---|---|
| #5-1 | Cu (C1011) | 0.3 | +0.5 | ETHANOL | 3 | 50 | 150 |
| #5-2 | Cu (C1011) | 0.3 | 0 | ETHANOL | 3 | 50 | 150 |
| #5-3 | Cu (C1011) | 0.3 | −0.5 | ETHANOL | 3 | 50 | 150 |

In #5-1 to #5-3, in which the value of x satisfied −2d≤x≤2d in spite of d=0.3, plasma could be generated in ethanol by applying an electric power of 150 W.

Sixth to Fourteenth Embodiments

In these embodiments, plasma was generated by the in-liquid plasma generating apparatus in a similar way to the first embodiment, except for changing the shape of the in-liquid plasma electrode 1 and changing the material of the conductive member and the insulating member, the kind of the liquid L, the interelectrode distance and the in-vessel pressure to the values shown in Tables 6 to 14. Hereinafter, in-liquid plasma electrodes 1" used in the respective embodiments will be described, using FIG. 6.

Figure 6:
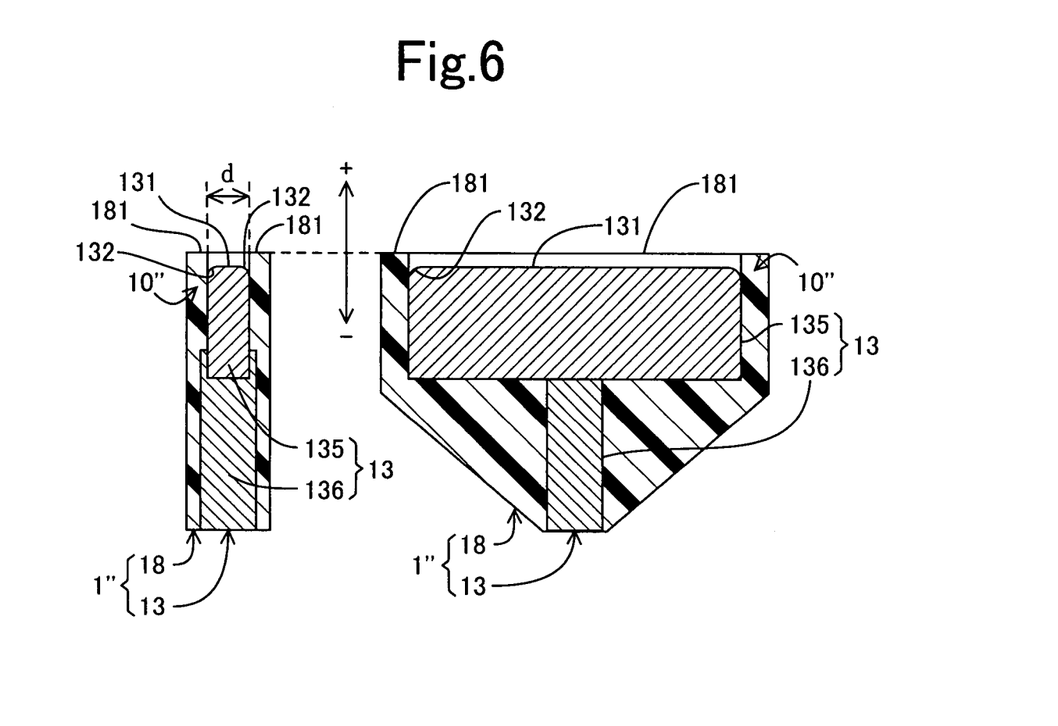
FIG. 6 are cross sectional views illustrating one example of an in-liquid plasma electrode of an embodiment and specifically illustrating two cross sections perpendicular to each other.

Each of the in-liquid plasma electrodes 1" of these embodiments comprises a conductive member 13 formed of metal and an insulating member 18. FIG. 6 show one example of the in-liquid plasma electrodes 1" of the sixth to fourteenth embodiments and are a longitudinally cross sectional view of the in-liquid plasma electrode 1" (the right figure of FIG. 6) and a cross sectional view of the in-liquid plasma electrode 1" perpendicular to the longitudinal direction (the left figure of FIG. 6). Employed as the conductive member 13 were a plate-shaped body 135 formed of pure aluminum (A1050) or pure copper (C1011) and having a size of 30 mm×10 mm×2 mm (d=2) when x=0, and a holder 136 having a rectangular column shape. Of the plate-shaped body 135, a flat end surface 131 of 10 mm×2 mm was used as an electric discharge end surface. At an edge of the end surface 131, a chamfered portion 132 of R=0.2 mm was formed. Part of a center of the other end portion opposed to the end surface 131 was inserted into a 2 mm-wide groove of the holder 136. Besides, as the insulating member 18, an insulating cover formed of ceramics or a glassfiber-mixed epoxy resin was used. The insulating cover was provided to cover the surface of the conductive member 13 (the plate-shaped-body 135 and the holder 136) at least except the end surface 131. At the electrode end portion 10", the insulating cover had a thickness of 3 mm.

At each of the electrode end portions 10" of the in-liquid plasma electrodes 1", the size of the insulating member 18 was adjusted to determine a distance x from a reference plane 181 to the end surface 131 (the electric discharge end surface) when the reference plane 181 was an end surface of the insulating member in roughly parallel to the end surface 131. In these embodiments, the in-liquid plasma electrodes 1" were assembled to the vessel 3 in such a way that the distance from the reference plane 181 to the end surface 131 (the electric discharge end surface) was any of x=±4, ±3, ±2, ±1, 0. Regarding the respective electrodes, values of the high frequency electric power when an electric discharge occurred are shown in Tables 6 to 14.

TABLE 6

| ELECTRODE | CONDUCTIVE MEMBER | | | KIND OF INSULATING MEMBER | KIND OF LIQUIDS | INTERELECTRODE DISTANCE D [mm] | ELECTRIC POWER AT PLASMA GENERATION [W] |
| --- | --- | --- | --- | --- | --- | --- | --- |
| | MATERIAL | SIZE d [mm] | DISTANCE x [mm] | | | | |
| #6-1 | Al (A1050) | 2 | +1 | CERAMICS | METHANOL | 2 | 400 |
| #6-2 | Al (A1050) | 2 | 0 | CERAMICS | METHANOL | 2 | 400 |
| #6-3 | Al (A1050) | 2 | −1 | CERAMICS | METHANOL | 2 | 440 |
| #6-4 | Al (A1050) | 2 | −2 | CERAMICS | METHANOL | 2 | 540 |
| #6-5 | Al (A1050) | 2 | −3 | CERAMICS | METHANOL | 2 | 540 |

TABLE 7

| ELECTRODE | CONDUCTIVE MEMBER | | | KIND OF INSULATING MEMBER | KIND OF LIQUIDS | INTERELECTRODE DISTANCE D [mm] | ELECTRIC POWER AT PLASMA GENERATION [W] |
| --- | --- | --- | --- | --- | --- | --- | --- |
| | MATERIAL | SIZE d [mm] | DISTANCE x [mm] | | | | |
| #7-1 | Al (A1050) | 2 | +1 | EPOXY | METHANOL | 2 | 300 |
| #7-2 | Al (A1050) | 2 | 0 | EPOXY | METHANOL | 2 | 400 |
| #7-3 | Al (A1050) | 2 | −1 | EPOXY | METHANOL | 2 | 390 |
| #7-4 | Al (A1050) | 2 | −2 | EPOXY | METHANOL | 2 | 400 |
| #7-5 | Al (A1050) | 2 | −3 | EPOXY | METHANOL | 2 | 400 |
| #7-6 | Al (A1050) | 2 | −4 | EPOXY | METHANOL | 2 | 500 |

TABLE 8

| ELECTRODE | CONDUCTIVE MEMBER | | | KIND OF INSULATING MEMBER | KIND OF LIQUIDS | INTERELECTRODE DISTANCE D [mm] | ELECTRIC POWER AT PLASMA GENERATION [W] |
| --- | --- | --- | --- | --- | --- | --- | --- |
| | MATERIAL | SIZE d [mm] | DISTANCE x [mm] | | | | |
| #8-1 | Cu (C1011) | 2 | +1 | EPOXY | METHANOL | 2 | 400 |
| #8-2 | Cu (C1011) | 2 | 0 | EPOXY | METHANOL | 2 | 400 |
| #8-3 | Cu (C1011) | 2 | −1 | EPOXY | METHANOL | 2 | 240 |
| #8-4 | Cu (C1011) | 2 | −2 | EPOXY | METHANOL | 2 | 300 |
| #8-5 | Cu (C1011) | 2 | −3 | EPOXY | METHANOL | 2 | 400 |
| #8-6 | Cu (C1011) | 2 | −4 | EPOXY | METHANOL | 2 | 500 |

TABLE 9

| ELECTRODE | CONDUCTIVE MEMBER | | KIND OF INSULATING MEMBER | KIND OF LIQUIDS | INTERELECTRODE DISTANCE D [mm] | ELECTRIC POWER AT PLASMA GENERATION [W] |
|---|---|---|---|---|---|---|
| | MATERIAL | SIZE d [mm] | DISTANCE x [mm] | | | |
| #9-1 | Al (A1050) | 2 | +1 | EPOXY | ETHANOL | 2 | 360 |
| #9-2 | Al (A1050) | 2 | 0 | EPOXY | ETHANOL | 2 | 300 |
| #9-3 | Al (A1050) | 2 | −1 | EPOXY | ETHANOL | 2 | 300 |

TABLE 10

| ELECTRODE | CONDUCTIVE MEMBER | | KIND OF INSULATING MEMBER | KIND OF LIQUIDS | INTERELECTRODE DISTANCE D [mm] | ELECTRIC POWER AT PLASMA GENERATION [W] |
|---|---|---|---|---|---|---|
| | MATERIAL | SIZE d [mm] | DISTANCE x [mm] | | | |
| #10-1 | Al (A1050) | 2 | +1 | CERAMICS | ETHANOL | 2 | 340 |
| #10-2 | Al (A1050) | 2 | 0 | CERAMICS | ETHANOL | 2 | 400 |
| #10-3 | Al (A1050) | 2 | −1 | CERAMICS | ETHANOL | 2 | 300 |
| #10-4 | Al (A1050) | 2 | −2 | CERAMICS | ETHANOL | 2 | 400 |

TABLE 11

| ELECTRODE | CONDUCTIVE MEMBER | | KIND OF INSULATING MEMBER | KIND OF LIQUIDS | INTERELECTRODE DISTANCE D [mm] | ELECTRIC POWER AT PLASMA GENERATION [W] |
|---|---|---|---|---|---|---|
| | MATERIAL | SIZE d [mm] | DISTANCE x [mm] | | | |
| #11-1 | Cu (C1011) | 2 | +1 | CERAMICS | METHANOL | 2 | 340 |
| #11-2 | Cu (C1011) | 2 | 0 | CERAMICS | METHANOL | 2 | 350 |
| #11-3 | Cu (C1011) | 2 | −1 | CERAMICS | METHANOL | 2 | 400 |
| #11-4 | Cu (C1011) | 2 | −2 | CERAMICS | METHANOL | 2 | 400 |

TABLE 12

| ELECTRODE | CONDUCTIVE MEMBER | | KIND OF INSULATING MEMBER | KIND OF LIQUIDS | INTERELECTRODE DISTANCE D [mm] | ELECTRIC POWER AT PLASMA GENERATION [W] |
|---|---|---|---|---|---|---|
| | MATERIAL | SIZE d [mm] | DISTANCE x [mm] | | | |
| #12-1 | Al (A1050) | 2 | +2 | EPOXY | METHANOL | 4 | 300 |
| #12-2 | Al (A1050) | 2 | +4 | EPOXY | METHANOL | 6 | 400 |
| #12-3 | Al (A1050) | 2 | +6 | EPOXY | METHANOL | 8 | >600 |

TABLE 13

| ELECTRODE | CONDUCTIVE MEMBER | | KIND OF INSULATING MEMBER | KIND OF LIQUIDS | INTERELECTRODE DISTANCE D [mm] | ELECTRIC POWER AT PLASMA GENERATION [W] |
|---|---|---|---|---|---|---|
| | MATERIAL | SIZE d [mm] | DISTANCE x [mm] | | | |
| #13-1 | Al (A1050) | 2 | +2 | CERAMICS | METHANOL | 4 | 430 |
| #13-2 | Al (A1050) | 2 | +4 | CERAMICS | METHANOL | 6 | 450 |
| #13-3 | Al (A1050) | 2 | +6 | CERAMICS | METHANOL | 8 | >600 |

TABLE 14

| ELECTRODE | CONDUCTIVE MEMBER | | KIND OF INSULATING MEMBER | KIND OF LIQUIDS | INTERELECTRODE DISTANCE D [mm] | ELECTRIC POWER AT PLASMA GENERATION [W] |
|---|---|---|---|---|---|---|
| | MATERIAL | SIZE d [mm] | DISTANCE x [mm] | | | |
| #14-1 | Al (A1050) | 2 | +1 | CERAMICS | TAP WATER | 2 | 500 |
| #14-2 | Al (A1050) | 2 | 0 | CERAMICS | TAP WATER | 2 | 500 |
| #14-3 | Al (A1050) | 2 | −1 | CERAMICS | TAP WATER | 2 | 500 |

In the sixth embodiment and the seventh embodiment, the material of the insulating member 18 (the insulating cover) was different between ceramics and epoxy resin. In both the sixth embodiment and the seventh embodiment, an electric discharge occurred before the electric power reached 600 W. In the seventh embodiment using the insulating cover formed of epoxy resin as the insulating member 18, however, plasma could be generated more efficiently at a lower electric power.

Moreover, in the sixth embodiment to the eighth embodiment, since −2d≤x≤2d, plasma could be generated in the liquid without applying extremely large electric power. Furthermore, if −d≤x≤d, an electric power necessary for plasma generation could be reduced.

In the ninth embodiment and the tenth embodiment, ethanol was used as the liquid L, and plasma could be generated even in ethanol.

The twelfth embodiment and the thirteenth embodiment are embodiments in which the distance from the end surface 131 (the electric discharge end surface) to the surface of the second electrode 4 was kept constant (2 mm). Under this condition, when x=6, no electric discharge occurred even when the electric power reached 600 W, but in the range where −2d≤x≤2d and furthermore −d≤x≤d, plasma could be generated in the liquid without applying an excessively large electric power. Moreover, in the twelfth embodiment using the insulating cover formed of epoxy resin, plasma could be generated more efficiently at a lower electric power.

Moreover, in the sixth embodiment to the fourteenth embodiment, pure aluminum or pure copper was employed as the conductive member 13, and in both the cases, plasma could be generated well. Furthermore, even when the liquid L was tap water as in the fourteenth embodiment, plasma could be generated well.

The generated plasma moved together with bubbles and came in contact with the surface of the second electrode 4 held in the liquid. In addition, in the sixth to thirteenth embodiments, when the surface of the second electrode 4 was observed after the electric discharge finished, it was confirmed that carbon activated into a plasma state inside the bubbles linearly deposited on the surface of the second electrode 4.

Fifteenth Embodiment

In the in-liquid plasma electrode 1' of the first embodiment, a comparison of electric power generating an electric discharge was carried out by using a variety of metals (specifically, high purity molybdenum (Mo), silver (Ag), aluminum (Al: A1050), tungsten (W), copper (Cu: C1011) as raw materials of the conductive member 12 and the results are shown in Table 15. In each of the in-liquid plasma electrodes 1', the conductive member 12 had a diameter of d=0.7 mm, the distance from the reference plane 171 to the end surface 121 (the electric discharge end surface) was x=2 mm. Regarding the respective electrodes, values of the high frequency electric power when an electric discharge occurred are shown in Table 15.

TABLE 15

| | METAL | | | | |
|---|---|---|---|---|---|
| | Mo | Ag | Al | W | Cu |
| ELECTRIC POWER (W) | 420 | 420 | 320 | 320 | 220 |

As shown in Table 15, copper generated an electric discharge at the smallest electric power. When silver or aluminum was used, the component was dissolved into the liquid L (tap water) after the electric discharge finished, and in the case of silver, the color of the tap water turned black and in the case of aluminum, it turned green.

Sixteenth Embodiment

An embodiment in which the in-liquid plasma generating method of the present invention was applied to aqueous solutions will be described. The construction of this embodiment was similar to that of the first embodiment, except that for the in-liquid plasma electrode 1', pure copper (C1011) with d=0.7 was used as the conductive member 12, a 1% NaCl aqueous solution or a 0.5% alum aqueous solution was used as the liquid L and the second electrode 4 was not immersed in the liquid L (this aimed matching). Moreover, the distance from the reference plane 171 to the end surface 121 (the electric discharge end surface) was x=−2 mm.

In both the cases where the liquid L was the NaCl aqueous solution or the alum aqueous solution, an electric discharge started when an electric power of 250 W was applied. Namely, even when the liquid L was an aqueous solution, an electric discharge could be obtained in the liquid. Especially, when the NaCl aqueous solution was used, emission of orange light, which was the D line of Na, was observed.

Seventeenth Embodiment

An embodiment in which the in-liquid plasma generating method of the present invention was applied to decomposition of materials will be described. In this embodiment, decomposition of food dyes will be shown. The construction of this embodiment was similar to that of the first embodiment, except that for the in-liquid plasma electrode 1' pure copper (C1011) with d=2.8 was used as the conductive member 12 and 300 cc of an aqueous solution containing a green dye (Blue No. 1: 1%, Yellow No. 4: 3.5%, starch: 94%) or a red dye (Red No. 102: 10%, starch: 90%) at a concentration of 0.1 g/L was used as the liquid L. Moreover, the distance from the reference plane 171 to the end surface 121 (the electric discharge end surface) was x=2 mm.

Figure 7:
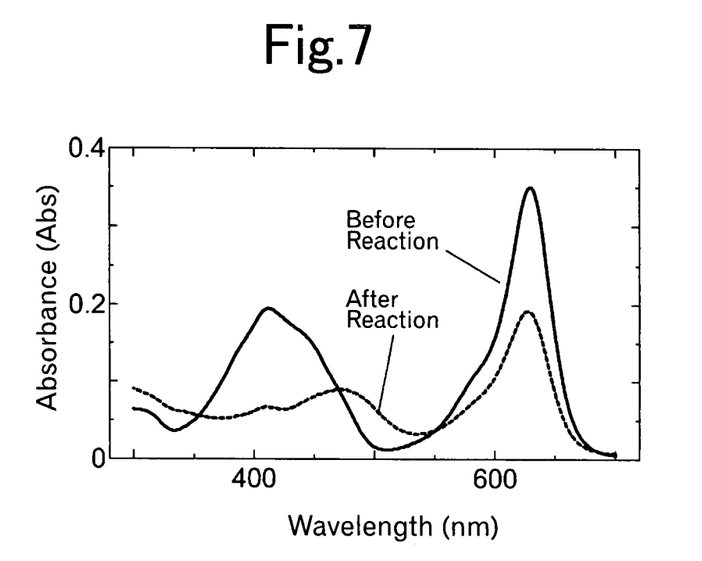
FIG. 7 is a graph showing absorption spectrometry results of a green dye.

In the case of the green dye, the liquid L containing the green dye discharged at 500 W, and the liquid L was exposed to the electric discharge by applying an electric power of 500 W for three minutes (reflection: 200 W). When compared to before the reaction, the color of the aqueous solution after the reaction became lighter and the color tone was also changed. In order to clarify this change quantitatively, absorption spectrometry was performed. The results are shown in FIG. 7. The height of the peak around 630 nm was reduced by 45%, and this indicates that a corresponding chemical substance was decomposed by 45%. The peak around 410 nm also became extremely small and it is clear from this that a chemical substance corresponding to 410 nm reacted faster than the chemical substance corresponding to the peak around 630 nm (blue).

Figure 8:
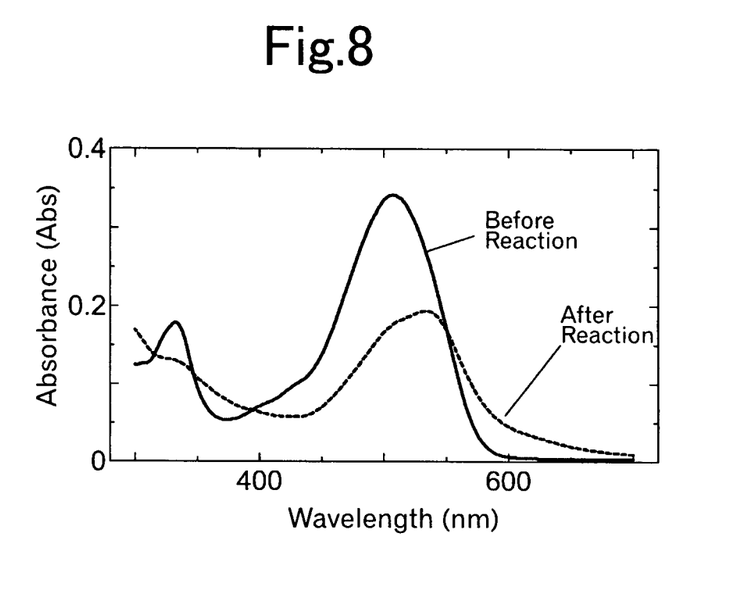
FIG. 8 is a graph showing absorption spectrometry results of a red dye.

On the other hand, in the case of the red dye, 300 W was applied for three minutes (reflection: 100 W) and the aqueous solution was exposed to the electric discharge. Absorption spectra before and after the reaction are shown in FIG. 8. The peak before the reaction (508 nm, 0.342 Abs) became smaller (0.194 Abs) after the reaction and was shifted to the long-wavelength side. This shift suggests a structural change such as dilation of a conjugate system by dehydrogenation or the like. As mentioned above, the present invention can be used as a chemical reactor by controlling conditions.

INDUSTRIAL APPLICABILITY

As mentioned above, the in-liquid plasma electrode, the in-liquid plasma generating apparatus and the in-liquid plasma generating method according to the present invention enable to generate high energy plasma in a wide variety of liquids containing a conductive liquid such as water and alcohol. Namely, the present invention can be applied to chemical vapor deposition, a chemical reactor, a cracking furnace for hazardous substances.

Furthermore, according to the in-liquid plasma generating method of the present invention, although a high temperature high energy plasma is generated in a liquid, the plasma is surrounded by the liquid having a large heat capacity and accordingly the present invention can be used for vapor deposition on the surface of low heat resistant materials.

The invention claimed is:

1. An in-liquid plasma electrode for generating plasma in a liquid, comprising:
    an electrically conductive member having a conductive end portion with an electric discharge end surface for contacting the liquid, the electric discharge end surface having an approximately circular or approximately rectangular cross section; and
    an electrically insulating member covering an outer periphery of the conductive member at least except the electric discharge end surface, the electric discharge end surface has an approximately circular or approximately rectangular cross section, wherein d and x satisfy $-2d \leq x \leq 2d$, where d is a length of a minor axis or a short side of the cross section, and x is a distance from a reference plane to a plane containing the electric discharge end surface when the reference plane is an end surface of the insulating member that is approximately parallel with the electric discharge end surface.

2. The in-liquid plasma electrode recited in claim 1, wherein the d and the x satisfy $-d \leq x \leq d$.

3. The in-liquid plasma electrode recited in claim 1, wherein x satisfies $-1 \leq x \leq 1$ (unit in mm),
    where x is a distance from a reference plane to a plane containing the electric discharge end surface when the reference plane is an end surface of the electrically insulating member that is approximately parallel with the electric discharge end surface.

4. The in-liquid plasma electrode recited in claim 1, wherein the cross section of the conductive end portion is a perfect circle or a rectangle.

5. The in-liquid plasma electrode recited in claim 1, wherein the x satisfies $x < 0$.

6. The in-liquid plasma electrode recited in claim 1, wherein the x satisfies $x = 0$.

7. The in-liquid plasma electrode recited in claim 1, wherein the x satisfies $0 < x$.

8. An in-liquid plasma generating apparatus comprising:
    a vessel containing a liquid;
    a first in-liquid plasma electrode having an electrically conductive member having an electric discharge end surface in contact with the liquid, the electric discharge end surface having an approximately circular or approximately rectangular cross section, and an electrically insulating member covering an outer periphery of the conductive member at least except the electric discharge end surface, the electric discharge end surface has an approximately circular or approximately rectangular cross section, wherein d and x satisfy $-2d \leq x \leq 2d$, where d is a length of a minor axis or a short side of the cross section, and x is a distance from a reference plane to a plane containing the electric discharge end surface when the reference plane is an end surface of the insulating member that is approximately parallel with the electric discharge end surface, and at least an end portion of the in-liquid plasma electrode being placed within the vessel;
    a second electrode having a portion in contact with the liquid; and
    a high frequency power source for supplying electric power to at least the electrically conductive member, wherein the first in-liquid plasma electrode and the second electrode have opposite electrical charges.

9. The in-liquid plasma generating apparatus recited in claim 8, wherein the second electrode faces the end portion of the first in-liquid plasma electrode.

10. An in-liquid plasma generating method for generating plasma in a liquid within an in-liquid plasma generating apparatus having a first in-liquid plasma electrode and a second electrode, which is characterized by supplying electric power by a high frequency electric source to the first in-liquid plasma electrode having an electrically conductive member having an electric discharge end surface in contact with the liquid, the electric discharge end surface having an approximately circular or approximately rectangular cross section, and an electrically insulating member covering an outer periphery of the conductive member at least except the electric discharge end surface, the electric discharge end surface has an approximately circular or approximately rectangular cross section, wherein d and x satisfy $-2d \leq x \leq 2d$, where d is a length of a minor axis or a short side of the cross section, and x is a distance from a reference plane to a plane containing the electric discharge end surface when the reference plane is an end surface of the insulating member that is approximately parallel with the electric discharge end surface.

11. The in-liquid plasma generating method recited in claim 10, wherein a water-containing material is used as the liquid.

* * * * *